US008519301B2

United States Patent
Duquette

(10) Patent No.: US 8,519,301 B2
(45) Date of Patent: Aug. 27, 2013

(54) BOOK TRIMMER WITH LASER SCORER

(75) Inventor: John Brian Duquette, Henniker, NH (US)

(73) Assignee: Goss International Americas, Inc., Durham, NH (US)

( * ) Notice: Subject to any disclaimer, the term of this patent is extended or adjusted under 35 U.S.C. 154(b) by 1556 days.

(21) Appl. No.: 10/683,013

(22) Filed: Oct. 10, 2003

(65) Prior Publication Data

US 2004/0134893 A1 Jul. 15, 2004

Related U.S. Application Data

(60) Provisional application No. 60/440,275, filed on Jan. 15, 2003.

(51) Int. Cl.
 *B23K 26/00* (2006.01)
(52) U.S. Cl.
 USPC ............. 219/121.72; 219/121.68; 219/121.67
(58) Field of Classification Search
 USPC ............. 219/121.68, 121.67, 121.69, 121.72, 219/121.85
 See application file for complete search history.

(56) References Cited

U.S. PATENT DOCUMENTS

| 3,733,947 | A | * | 5/1973 | Bryson et al. | 83/280 |
| 4,505,173 | A | * | 3/1985 | Hartlage | 83/112 |
| 5,364,215 | A | * | 11/1994 | Snellman et al. | 412/3 |
| 5,367,928 | A | * | 11/1994 | Geiser et al. | 83/49 |
| 5,557,311 | A | * | 9/1996 | Perrington et al. | 347/111 |
| 5,797,320 | A | * | 8/1998 | Buschulte et al. | 101/226 |
| 6,134,999 | A | * | 10/2000 | Herman | 83/35 |
| 6,152,002 | A | * | 11/2000 | Muller | 83/37 |
| 6,191,382 | B1 | * | 2/2001 | Damikolas | 219/121.62 |
| 6,443,682 | B2 | * | 9/2002 | Marsh | 412/16 |
| 6,584,899 | B1 | * | 7/2003 | Buschulte et al. | 101/226 |
| 6,945,922 | B2 | * | 9/2005 | Baggot et al. | 493/63 |
| 2002/0034428 | A1 | | 3/2002 | Marsh | 412/16 |
| 2004/0020340 | A1 | | 2/2004 | Burke et al. | |
| 2004/0179921 | A1 | * | 9/2004 | Hobbs | 412/18 |

FOREIGN PATENT DOCUMENTS

| EP | 0893277 | 3/2002 |
| EP | 1201379 | 5/2002 |
| WO | WO 02/078916 A2 * | 10/2002 |

\* cited by examiner

*Primary Examiner* — M. Alexandra Elve
(74) *Attorney, Agent, or Firm* — Davidson, Davidson & Kappel, LLC

(57) ABSTRACT

A trimmer for trimming a book has a support for supporting a book, at least one laser for scoring an edge of the book so as to produce a score, and a trimming station for trimming the book at the score.

16 Claims, 1 Drawing Sheet

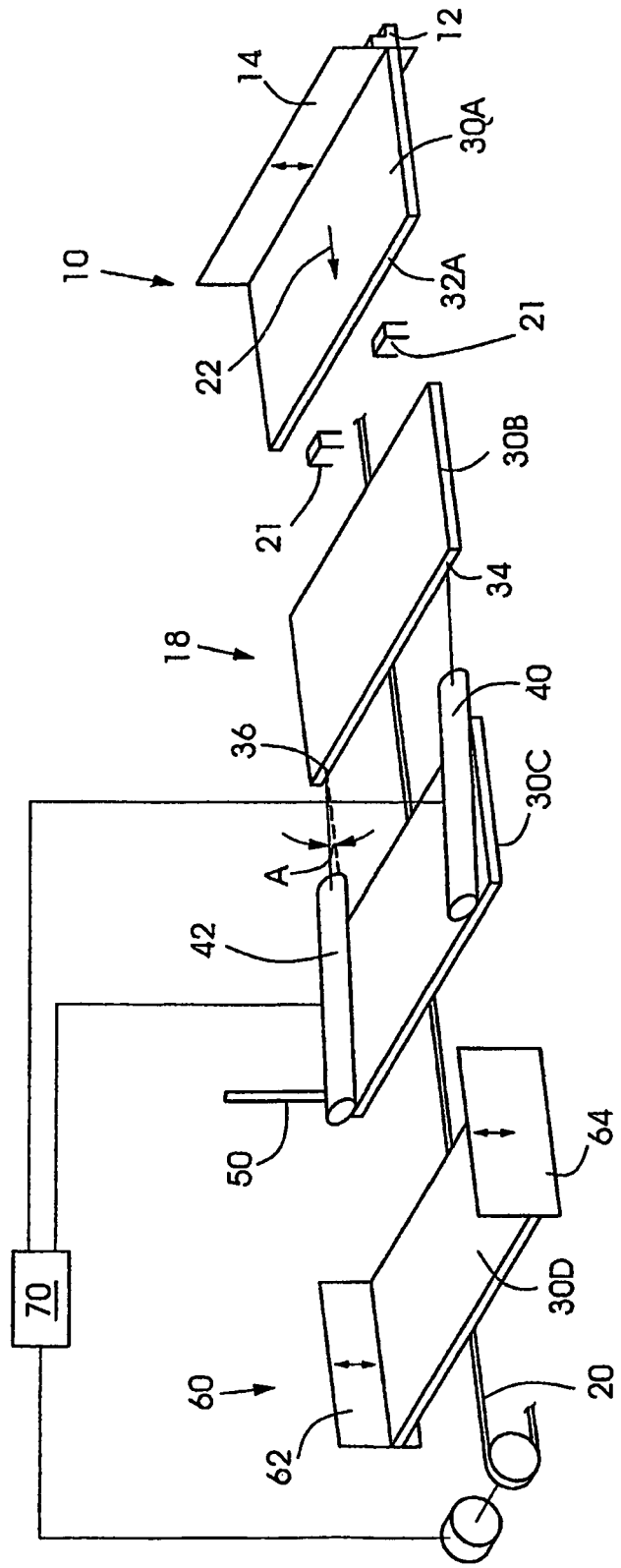

BOOK TRIMMER WITH LASER SCORER

CROSS-REFERENCE TO RELATED APPLICATIONS

Priority to U.S. Provisional Application No. 60/440,275, filed Jan. 15, 2003 and hereby incorporated by reference herein, is claimed.

BACKGROUND OF THE INVENTION

The present invention relates generally to printed materials and more particularly to trimming units for trimming edges of a book.

U.S. application No. 2002/0034428 discloses a trimmer for trimming excess margins along one, two or three edges of a perfect bound book. The book is gripped by a book holder, and a shearing blade cuts the edges of the book. The shearing blade has a flat edge and reciprocates.

European Patent Application No. 1 201 379 discloses a three-sided trimmer having a top edge cutting knife, a bottom edge cutting knife and a fore edge cutting knife, all with flat edges and reciprocating.

European Patent Application No. 0 893 277 discloses a trimmer, particularly for trimming book backs. A milling cutter has a disc-shaped body specially shaped teeth. The trimmer is a rotary cutter.

A problem associated with prior art trimmers used for trimming books is the delamination of the cover of a book from the interior sheet material, or the tearing of the book material. This trim defect is typically called "chipout" or "tearout".

It has been known to score the spine of the book with scoring knives before the head and foot of the book are trimmed.

SUMMARY OF THE INVENTION

Co-pending U.S. application Ser. No. 10/208,551 of the present assignee, filed Jul. 20, 2002 and hereby incorporated by reference herein, discloses a trimming blade for minimizing chipout.

Mechanical scoring knives face issues such as blade wear, cycling times and problems scoring shapes.

An object of the present invention is to improve the trimming of books, especially of the sides of books adjacent to the spine. Another alternate or additional object of the present invention is to reduce chipout. Yet another alternate or additional object of the present invention is to improve scoring speed and/or provide for scoring of irregularly shaped spines and/or improve wear characteristics of a scoring device.

The present invention provides a trimmer for trimming a book comprising:
 a support for supporting a book;
 at least one laser for scoring an edge of the book so as to produce a score; and
 a trimming station for trimming the book at the score.

By using a laser to produce a score, chipout may be minimized. Scoring speed and scoring device wear can be improved. Irregularly shaped edges can be scored.

Preferably, the edge is a spine of the book. The laser may score, for example, an outer layer of cover material at the spine or through the entire spine.

The support preferably is a conveyor and the at least one laser is stationary.

Advantageously, two lasers may be used to score the edge at the head and the foot of the book, although one laser also may be used. A single laser with a beam splitter may also be used.

The laser beam of the laser preferably contacts the edge at an acute angle, although other angles may be used.

The trimmer may be a three-edge trimmer, with a face trimming station and with a head and foot trimming station as the trimming station for trimming at the score. Preferably, the laser scoring device scores the spine just upstream of the head and foot station. For example, in certain trimmers the laser scoring device may be downstream from the face trimming station, so that the action of the face trimming station does not alter the score location for the head and foot station.

The present invention also provides a method for trimming a book comprising the steps of scoring an edge of the book using a laser so as to create a score, and trimming the book at the score.

Also provided is a laser scoring station comprising a support for supporting a book and at least one laser for scoring an edge of the book so as to produce a score.

BRIEF DESCRIPTION OF THE DRAWINGS

FIG. 1 shows one embodiment of the trimmer of the present invention using two lasers.

DETAILED DESCRIPTION

FIG. 1 shows an embodiment of a trimmer for books 30A, 30B, 30C, 30D moving in a direction 22. The books have their spines facing forward, so that for example spine 32A of book 30A faces in the direction of travel. A first conveyor 12 moves book 30A to a face trimming station 10 having a reciprocating blade 14 for trimming the face of the book 30A. Retractable stops 21 may stop the spine 32A to position the face for trimming. The face is opposite spine 32A. Book 30A may be clamped in face trimming station 10 during the face trimming operation.

The stops may then be retracted and the books are then transferred, for example by conveyor 12, to conveyor 20, which may have a lower and top belt to transport the books. At a spine scoring location 18, book 30B may be scored by lasers 40, 42 at both a head location 34 and a foot location 36. Lasers 40, 42 thus are located at the sides of the conveyor 20, and supported by a frame 50. Lasers 40, 42 may be adjustable with respect to the frame 50 for minor adjustments of the score position, but are fixed during operation. Lasers 40, 42 may score the spine at an angle A, which may be for example 45 degrees.

A controller 70 may have an input identifying the position and speed of the products on conveyor 20, and control the pulsing of the lasers 70, 72 so that the laser beams of the lasers 70, 72 score the laser for an appropriate amount of time at an appropriate power. A thickness of the book can also be input into controller 70. The score preferably cuts through the spine, for example the glued section of the spine. Angle A preferably is an acute angle.

Scored book 30C passes by the lasers 40, 42 to a head and foot trimming station 60, where a reciprocating head trimming blade 64 trims the head of book 30D at a score location equivalent to score 34 and a reciprocating foot blade 62 trims the foot of the book 30D at a score location equivalent to score 36 of book 30B. The book 30D may be clamped during the trimming operation of station 60.

The laser scoring reduces chipout caused by the blades 62, 64. The laser scoring reduces scoring blade wear, and permits for faster scoring.

For many applications, the lasers 70, 72 may be for example RF excited CO2 lasers from the firm Coherent, Inc. operating at a wavelength of 10.6 micrometers and having a power of 30 watts. Appropriate scores using such lasers for certain trimmers for book thicknesses up to 1 inch may result for example at conveyor speeds of about 50 meters per second and pulse times of about 0.3 seconds. However, other types of lasers may be used.

The present invention is not limited to any specific speeds, laser types, laser powers, pulse durations, trimmer blade types, trimmer types or book thicknesses, and the appropriate combination of such attributes may be determined as required by the specific application. For example, such attributes may be determined for a particular trimmer by viewing finished books for chipout, and altering one or more attribute to reduce chipout if chipout has occurred. Such attributes also may change depending on a type of glue used for the spine, for example. The attributes may also be changed upon a review by an operator of the scoring depth of the score. For example, if the score appears to be too shallow, the pulse duration or laser power may be increased.

While a specific trimmer has been disclosed, the trimmer may be of any type, including a single station trimmer that does not convey the book.

"Book" as defined herein may be any collection of sheet material with a spine.

What is claimed is:

1. A trimmer for trimming a book comprising:
   a support for supporting a book;
   at least one laser for scoring an edge of the book so as to produce a score; and
   a trimming station for trimming the book at the score.

2. The trimmer as recited in claim 1 wherein the laser scores a spine of the book, the edge being the spine.

3. The trimmer as recited in claim 1 wherein the support includes a conveyor and the at least one laser is stationary.

4. The trimmer as recited in claim 1 wherein the at least one laser includes a first laser for scoring a head of the book and a second laser for scoring a foot of the book, the trimming station being a head and foot trimming station with two trimming blades.

5. The trimmer as recited in claim 1 wherein the laser emits a laser beam contacting the edge at an acute angle.

6. The trimmer as recited in claim 1 further comprising a face trimming station for trimming a face of the book prior to the laser scoring.

7. The trimmer as recited in claim 1 wherein a total pulse duration of the laser on the edge is a function of a thickness of the book.

8. A method for trimming a book comprising the steps of:
   scoring an edge of the book using a laser so as to create a score, and
   trimming the book at the score.

9. The method as recited in claim 8 wherein the edge is a spine of the book.

10. The method as recited in claim 8 further comprising scoring an edge of the book with a second laser to create a second score and trimming the book at the second score.

11. The method as recited in claim 8 further comprising transporting the book with a conveyor after scoring to a trimming station.

12. The method as recited in claim 8 further comprising trimming a face of the book with a first trimming unit prior to scoring step.

13. The method as recited in claim 8 wherein the scoring step includes scoring the book through an entirety of the spine.

14. The method as recited in claim 11 further comprising altering a characteristic of the laser or a speed of the conveyor as a function of a review of finished books for chipout.

15. The method as recited in claim 11 further comprising altering a characteristic of the laser or a speed of the conveyor as a function of a depth of the score.

16. The method as recited in claim 11 further comprising altering a characteristic of the laser or a speed of the conveyor as a function of a thickness of the book.

* * * * *